(12) United States Patent
Fujiwara et al.

(10) Patent No.: US 7,918,573 B2
(45) Date of Patent: Apr. 5, 2011

(54) LIGHT GUIDE DEVICE AND LIGHT GUIDE APPARATUS

(75) Inventors: Toshimitsu Fujiwara, Kusatsu (JP); Atsushi Sawada, Ritto (JP); Kosuke Sanari, Kusatsu (JP); Yusuke Akioka, Kyoto (JP)

(73) Assignee: OMRON Corporation, Kyoto-shi, Kyoto (JP)

( * ) Notice: Subject to any disclaimer, the term of this patent is extended or adjusted under 35 U.S.C. 154(b) by 496 days.

(21) Appl. No.: 12/035,764

(22) Filed: Feb. 22, 2008

(65) Prior Publication Data

US 2008/0205056 A1    Aug. 28, 2008

(30) Foreign Application Priority Data

Feb. 23, 2007  (JP) ................................. 2007-043709

(51) Int. Cl.
   *G01D 11/28*    (2006.01)
(52) U.S. Cl. .......... 362/26; 362/246; 362/800; 362/612; 362/615; 362/629
(58) Field of Classification Search .................... 362/26, 362/246, 800, 612, 615, 629
   See application file for complete search history.

(56) References Cited

U.S. PATENT DOCUMENTS

2006/0171137 A1    8/2006  Tamaki
2006/0291183 A1*  12/2006  Nishiyama et al. ............. 362/26

FOREIGN PATENT DOCUMENTS

| CN | 1 821 847 A | 8/2006 |
| JP | 2006-228635 A | 8/2006 |
| JP | 2006-236974 A | 9/2006 |

OTHER PUBLICATIONS

English abstract of JP2006236974 published Sep. 7, 2006, esp@cenet database, 1 page.
English abstract of JP2006228635 published Aug. 31, 2006, esp@cenet database, 1 page.
European Search Report from Application No. 08150175.1 dated Jul. 1, 2008 (6 pages).

* cited by examiner

*Primary Examiner* — Sandra L O Shea
*Assistant Examiner* — Jessica L McMillan
(74) *Attorney, Agent, or Firm* — Osha Liang LLP

(57) ABSTRACT

An aspect of the present invention provides a compact light guide device and a light guide apparatus having high productivity and an even light emission property. A light guide device is made of a translucent material, and LED is disposed in a notch step portion formed by cutting at least a part of an inner peripheral surface, thereby guiding light from LED to emit the light to the outside. Particularly, in a surface and a backside of a sidewall portion of the notch step portion, the sidewall portion facing a light-emitting portion of the light-emitting element, at least an inward surface constitutes a reflecting surface diffusing the light, and a pair of facing surface adjacent to each other on both sides of the sidewall portion constitutes a light acceptance surface receiving the light reflected from the reflecting surface.

8 Claims, 9 Drawing Sheets

| Angle (°) | Brightness unevenness | Visual quality |
|---|---|---|
| 0 | 37.9% | ○ |
| 2.5 | 36.7% | ○ |
| 5 | 30.3% | ○ |
| 7.5 | 30.1% | ○ |
| 10 | 27.0% | ○ |

LIGHT GUIDE DEVICE AND LIGHT GUIDE APPARATUS

BACKGROUND OF THE INVENTION

1. Field of the Invention

The present invention relates to a light guide device, particularly to a light guide device utilizing LED light having strong optical directivity and a light guide apparatus into which the light guide device is incorporated.

2. Description of the Related Art

Conventionally, for example, a ring illuminator is known as the light guide device. In the ring illuminator, plural light guide paths are projected outward from an outer peripheral portion of a ring light guide body, and an illuminator portion is disposed in a free end face of the light guide path (refer to, for example, Japanese Patent Application Laid-Open No. 2006-236974).

However, in the ring illuminator, downsizing is hardly achieved because of the need for providing the plural light guide paths projected from outer peripheral portion.

Therefore, there is proposed a light guide plate, wherein light from a light-emitting element is reflected once by a substantially-chevron reflecting surface formed by partially cutting a light guide device, and the reflected light is received by facing surfaces formed on both sides of the reflecting surface (refer to, for example, Japanese Patent Application Laid-Open No. 2006-228635).

However, because the reflecting surface is formed in the substantially-chevron shape, uneven brightness is easily generated to hardly obtain the light guide device evenly emitting the light in the case of low dimensional accuracy of the reflecting surface or low alignment accuracy of the light-emitting element. Particularly, the improved dimensional accuracy and alignment accuracy are required with downsizing the apparatus, which results in problems of low productivity and difficulty of even light emission.

In view of the foregoing, an object of the present invention is to provide compact light guide device and light guide apparatus having the high productivity and an even light emission property.

SUMMARY OF THE INVENTION

In order to solve the above problems, in accordance with a first aspect of the present invention, a light guide device made of a translucent material, a light-emitting element being disposed in a notch step portion formed by cutting at least a part of an inner peripheral surface in the light guide device, thereby guiding light from the light-emitting element to emit the light to an outside, wherein at least an inward surface constitutes a reflecting surface diffusing the light in a surface and a backside of a sidewall portion of the notch step portion, the sidewall portion facing a light-emitting portion of the light-emitting element, and a pair of facing surfaces adjacent to each other on both sides of the sidewall portion constitutes a light acceptance surface receiving the light reflected from the reflecting surface.

In the first aspect of the present invention, because the light from the light-emitting element is diffused and reflected by the reflecting surface, even if the light-emitting element has the low alignment accuracy, there is the little unevenness of the brightness in the light received by the light acceptance surface. This enables the light guide device to emit the light having the even brightness. Particularly, the high dimensional accuracy and alignment accuracy are not required because the uneven brightness is hardly generated in the light received by the light acceptance surface. Accordingly, the compact, high-productivity light guide device is obtained.

In the light guide device according to first aspect of the present invention, preferably at least an outward surface constitutes the reflecting surface reflecting the light in the light acceptance surface in the surface and backside of the sidewall portion of the notch step portion, the sidewall portion facing the light-emitting portion of the light-emitting element. Accordingly, the reflecting surface is formed in the outer peripheral surface of the light guide device, which facilitates the production to further improve the productivity.

In the light guide device according to first aspect of the present invention, preferably a whole of at least an outer peripheral surface facing the light-emitting portion of the light-emitting element constitutes the reflecting surface. Accordingly, in addition to the above-described effect, leakage of the light received by the light acceptance surface from the outer peripheral surface is eliminated to obtain the efficient light guide device.

In the light guide device according to first aspect of the present invention, preferably the light guide device is formed in an annular shape or a square frame body. Accordingly, a degree of freedom of design is conveniently increased.

In the light guide device according to first aspect of the present invention, preferably the light acceptance surfaces face each other in parallel. The light acceptance surface is not limited to a smooth surface, but the light acceptance surface may be formed in a tapered surface or an arc surface. Accordingly, the efficient light guide device which is easily produced by selecting the optimum light acceptance surface according to a status of use.

In accordance with a second aspect of the present invention, a light guide apparatus, wherein a part of the light-emitting element projected from the notch step portion is coated with a coating sheet in the light-emitting element disposed in the notch step portion of the light guide device.

Accordingly, the unevenness of the brightness caused by the variation in alignment position is hardly generated because the light from the light-emitting element is hardly directly incident to the light guide device.

In accordance with a second aspect of the present invention, a light guide apparatus, wherein a hole through which light of a light-emitting element can directly be emitted outward from a light guide portion is made in a housing jointed to cover the light guide portion of the light guide device.

Accordingly, because not only the light of the light guide device is directly emitted to the outside but also the light is emitted from the housing, a wide variety of expressions can be realized to obtain the user-friendly light guide apparatus.

DETAILED DESCRIPTION OF THE PREFERRED EMBODIMENT

Figure 1A:
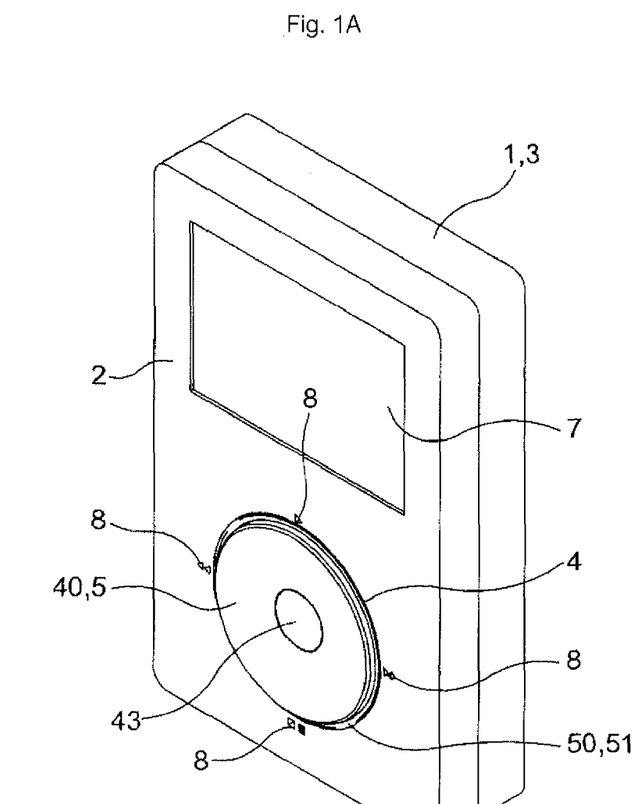
FIGS. 1A and 1B are a perspective view and a front view showing the case in which a light guide device according to an embodiment of the present invention is incorporated into a portable music player, respectively.
Figure 1B:
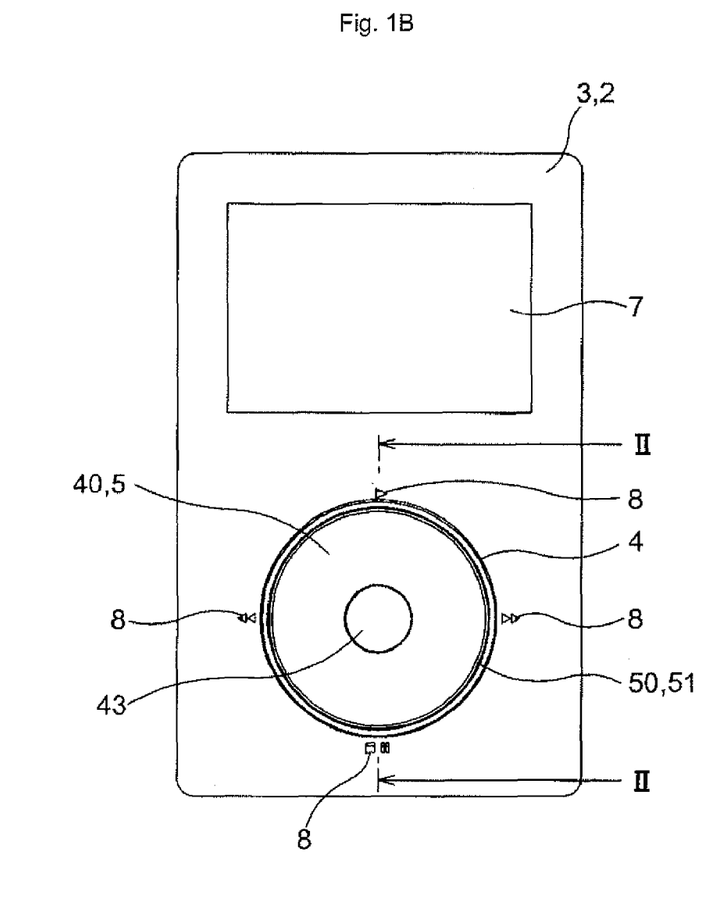

A preferred embodiment of the present invention will be described below with reference to the accompanying drawings. As shown in FIG. 1, the embodiment is applied to a portable music player, and a manipulation input device 5 and a ring light guide device 50 are integrally built into an attaching hole 4 of a housing 3 including a base 1 and a cover 2. The manipulation input device 5 is used when a scroll bar in a monitor 7 is scrolled to make selection and direction. A manipulation directing hole 8 is made in an opening edge portion of the attaching hole 4.

Figure 4:
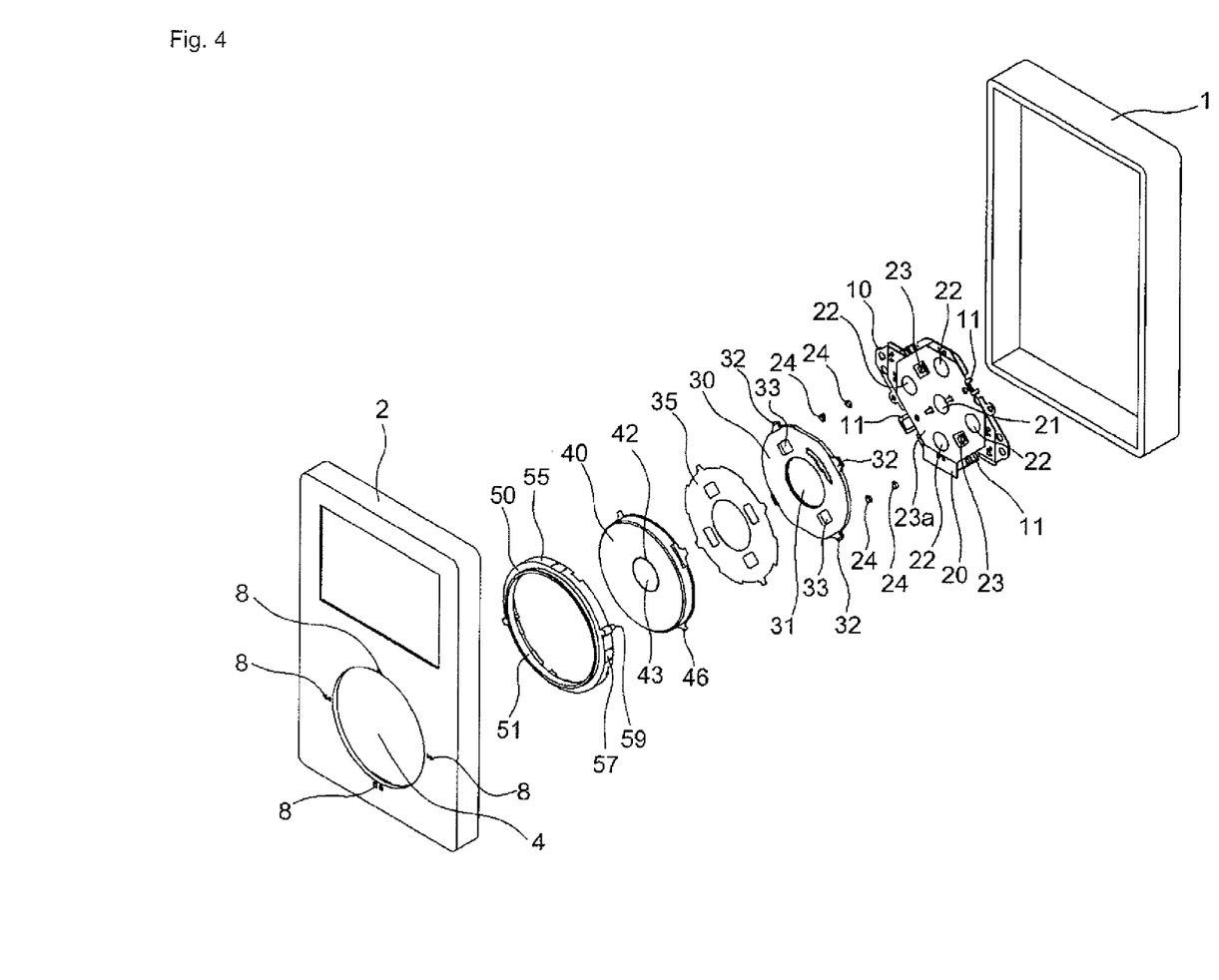
FIG. 4 is an exploded perspective view showing the light guide device of the embodiment of FIG. 1A.
Figure 5:
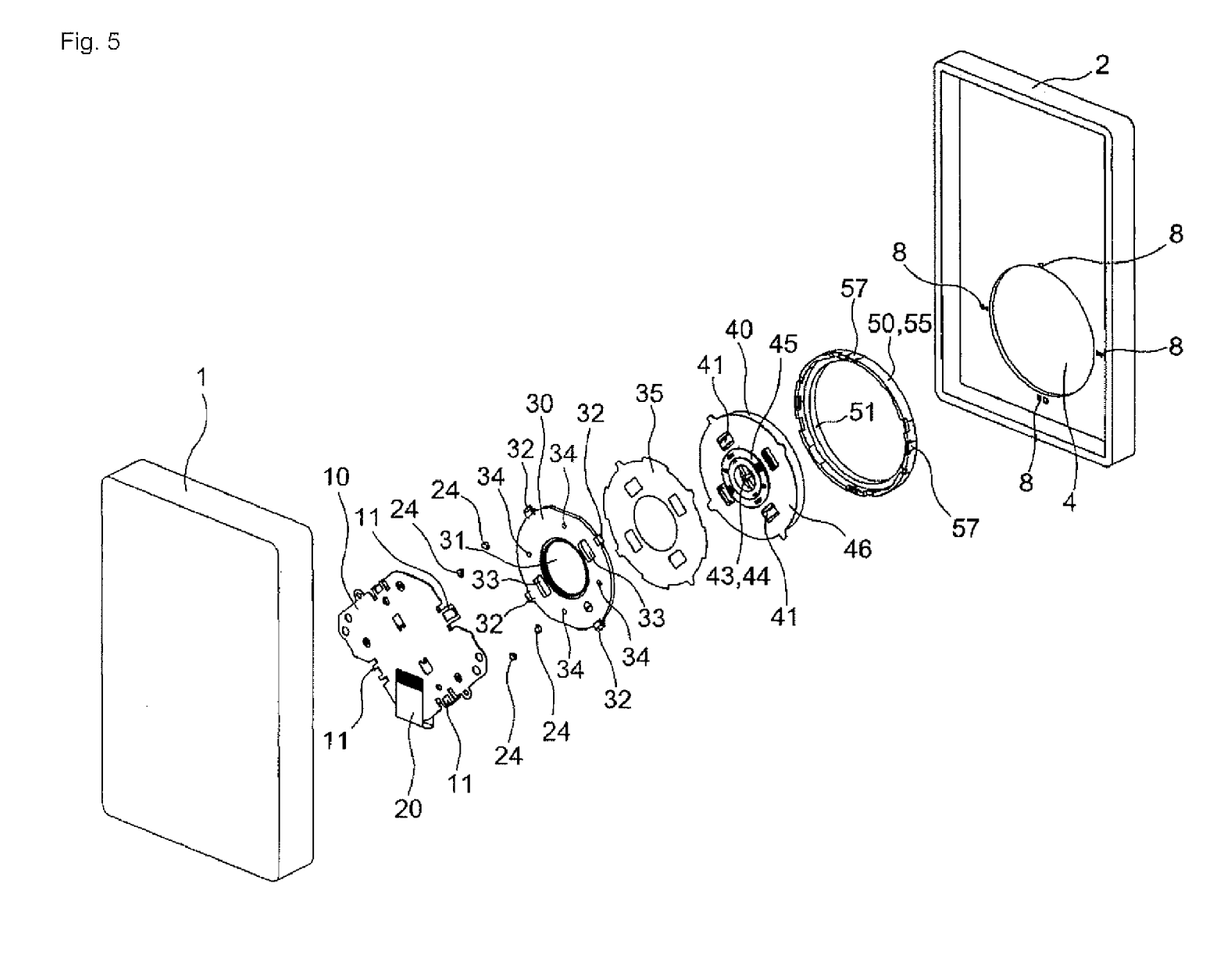
FIG. 5 is an exploded perspective view showing the light guide device of the embodiment when viewed from an angle different from that of FIG. 4.

As shown in FIGS. 4 and 5, the manipulation input device 5 includes a metal base 10 and a flexible resin film, a printed board 20, four LEDs 24, a manipulation tool 30, a shielding sheet 35, and a manipulation dial 40. The printed board 20 is covered with an insulating sheet 23a. The LEDs 24 are light-emitting elements surface-mounted on the printed board. A push button 43 is fitted in the center of the manipulation dial 40.

As shown in FIGS. 4 and 5, the metal base 10 is formed in a substantially-square shape, and can be fixed in the housing 3. In the metal base 10, elastic engaging portions 11 are raised in substantially-central portions of sides thereof.

Figure 2:
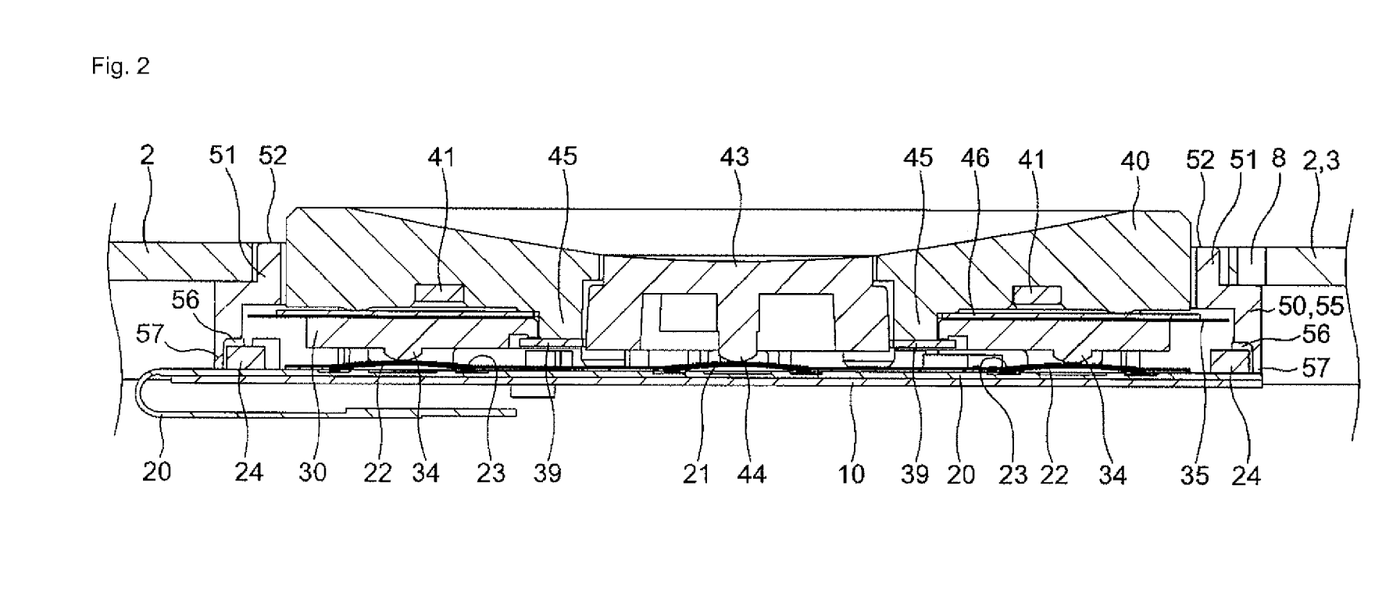
FIG. 2 is a sectional view taken on a line II-II of FIG. 1B.

As shown in FIGS. 2 to 5, the printed board 20 is formed by a flexible resin film having the substantially same planar shape as the metal base 10. A center switch 21 is disposed in the center of the printed board 20, and switches 22 are arranged around the center switch 21 at equal intervals. A pair of Hall elements 23 and 23 and the four LEDs 24 are mounted at predetermined positions in the printed board 20. As shown in FIGS. 2 and 4, insulating sheet 23a adheres integrally to a surface of the printed board 20 except for a portion to be exposed.

Figure 3:
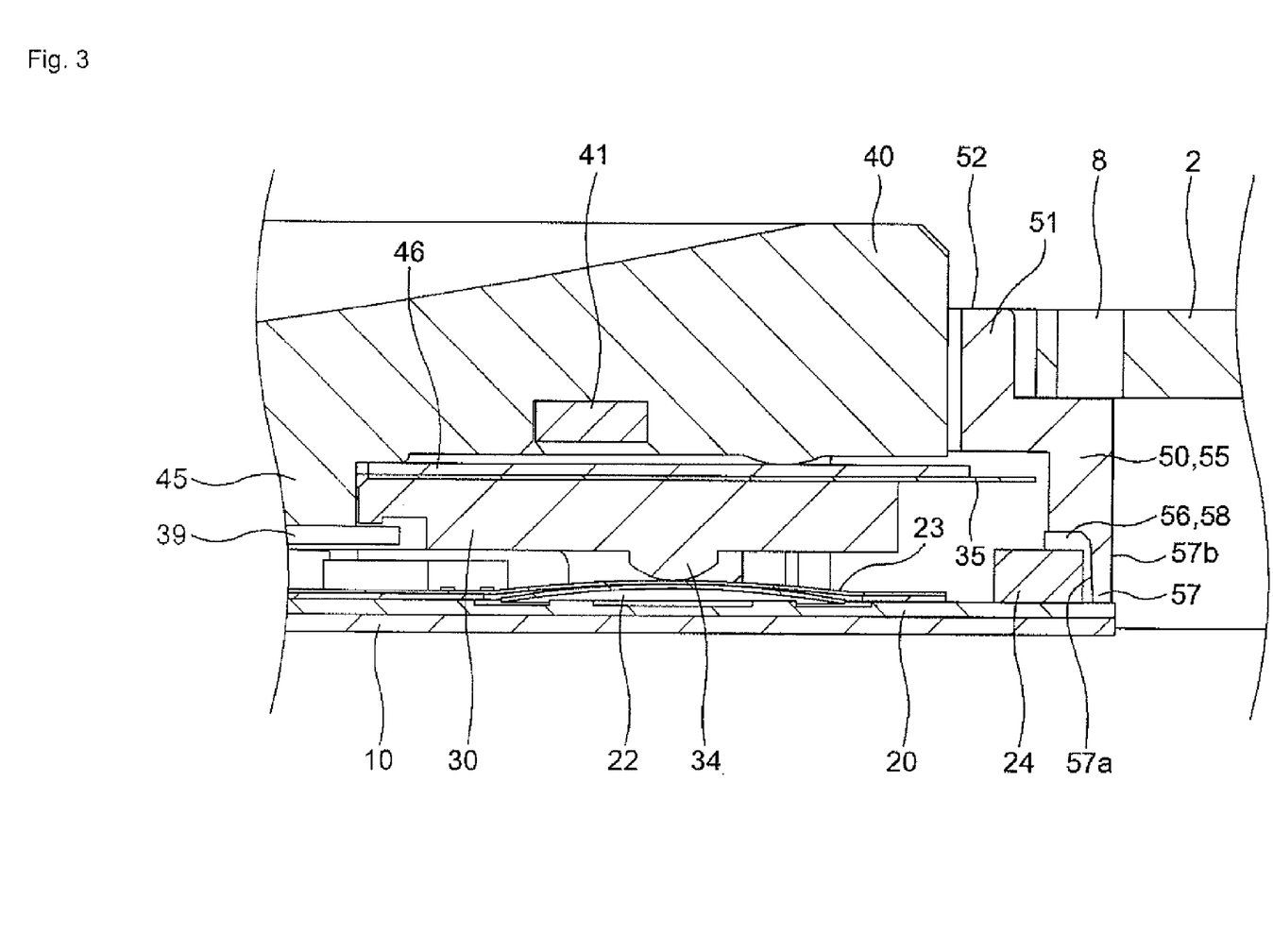
FIG. 3 is a partially enlarged view of FIG. 2.

The manipulation tool 30 has a planar shape with which the printed board 20 can be covered. A fitting hole 31 is made in a central portion of manipulation tool 30, and engaging pawls 32 are projected in an outer peripheral edge portion to engage the elastic engaging portion 11 of metal base 10. In order to cause a magnetic flux of the permanent magnet 41 to pass easily, through-holes 33 are made in the manipulation tool 30 so as to surround the fitting hole 31. As shown in FIGS. 3 and 5, manipulating projections 34 are projected in the backside of the manipulation tool 30 to press down the switch 22.

The shielding sheet 35 is used to shield the light of the LED 24 such that the light is not directly incident to the light guide device 50, and has a planar shape with which the four LEDs 24 mounted on the printed board 20 can be coated.

As shown in FIGS. 4 and 5, an annular permanent magnet 41 in which N poles and S poles are alternately arranged is fixed to the backside of the manipulation dial 40, and the push button 43 is fitted in a center hole 42 of the permanent magnet 41 while being able to be pressed down. A manipulating projection 44 is projected in a central portion of a bottom surface of the push button 43. An annular rib 45 is projected in an edge portion of the backside of the center hole 42. The bottom surface of the manipulation dial 40 is coated with a sliding sheet 46 having the substantially same planar shape as the manipulation tool 30. However, as shown in FIG. 5, a part of the permanent magnet 41 can be seen from a through-hole 47 made in the sliding sheet 46. Alternatively, the sliding sheet 46 may be used as the shielding sheet to reduce the number of component and assembling man-hour.

Figure 6A:
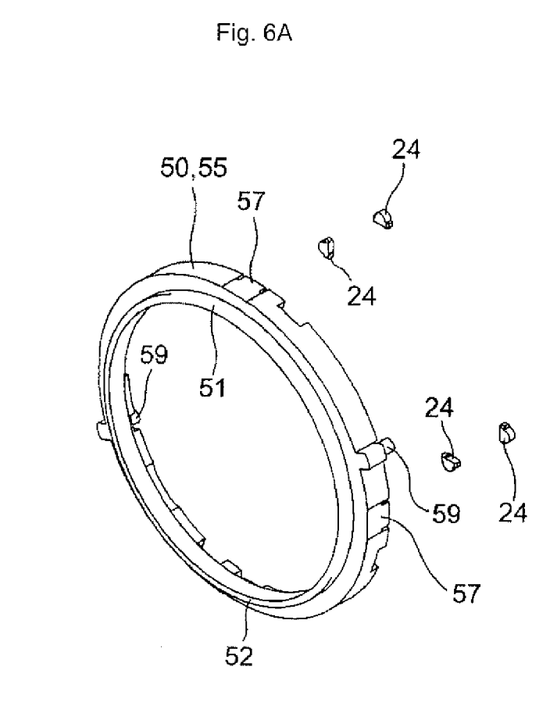
FIGS. 6A, 6B, and 6C are a rear side view, a left side view, and a perspective view showing a light guide ring when viewed from different angles.
Figure 6B:
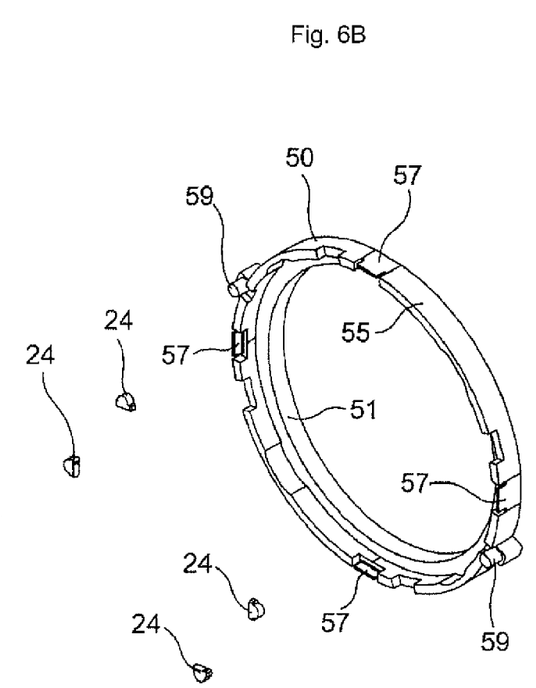
Figure 6C:
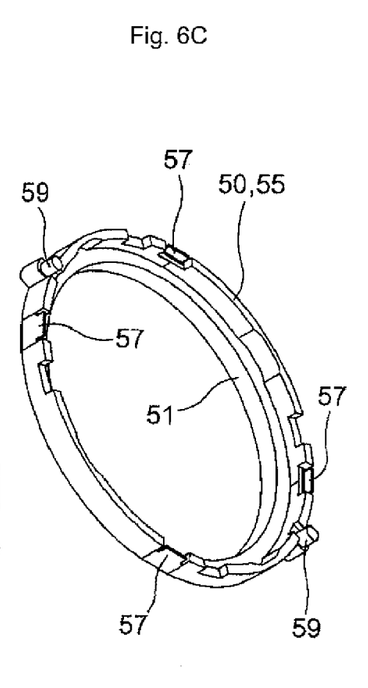
Figure 7A:
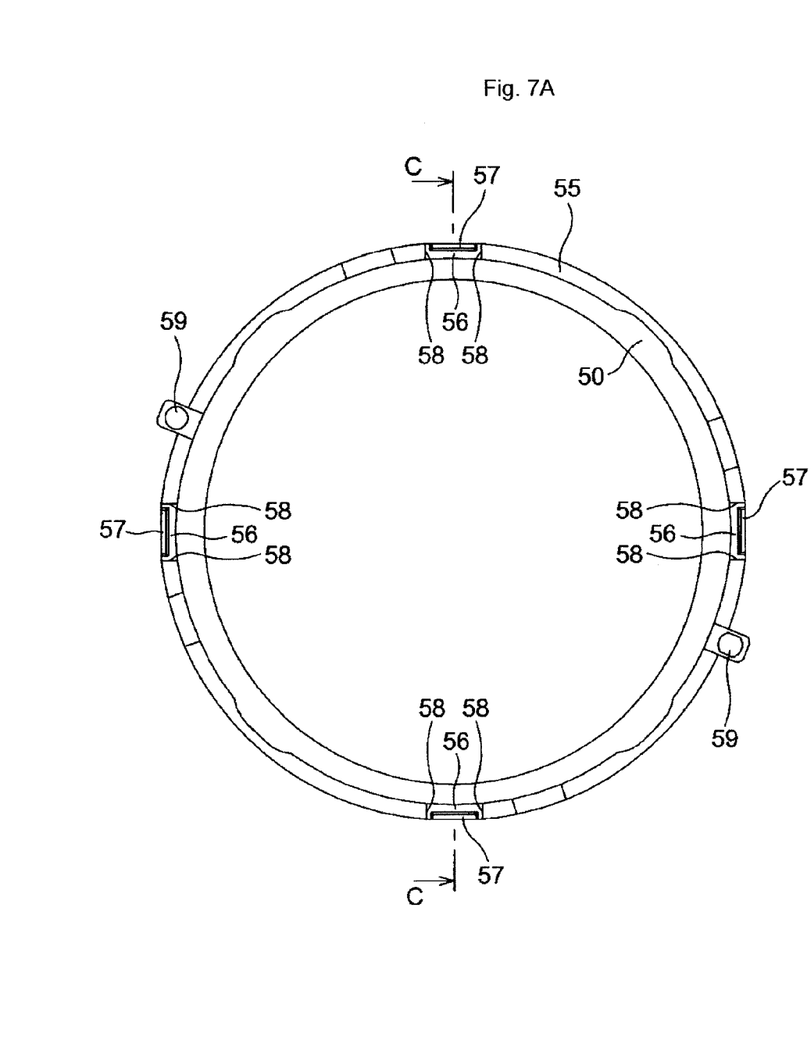
FIG. 7A is a rear side view showing a light guide ring.
Figure 7B:
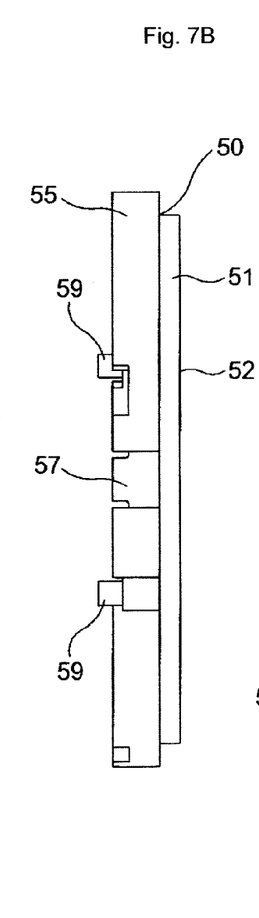
FIG. 7B is a left side view showing a light guide ring.
Figure 7C:
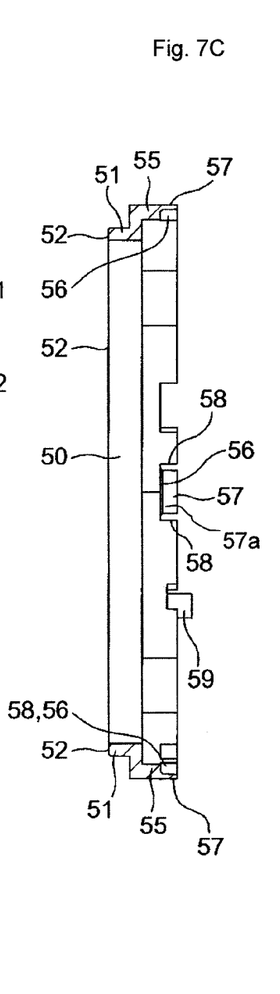
FIG. 7C is a sectional view taken on a line C-C of FIG. 7A.
Figure 8A:
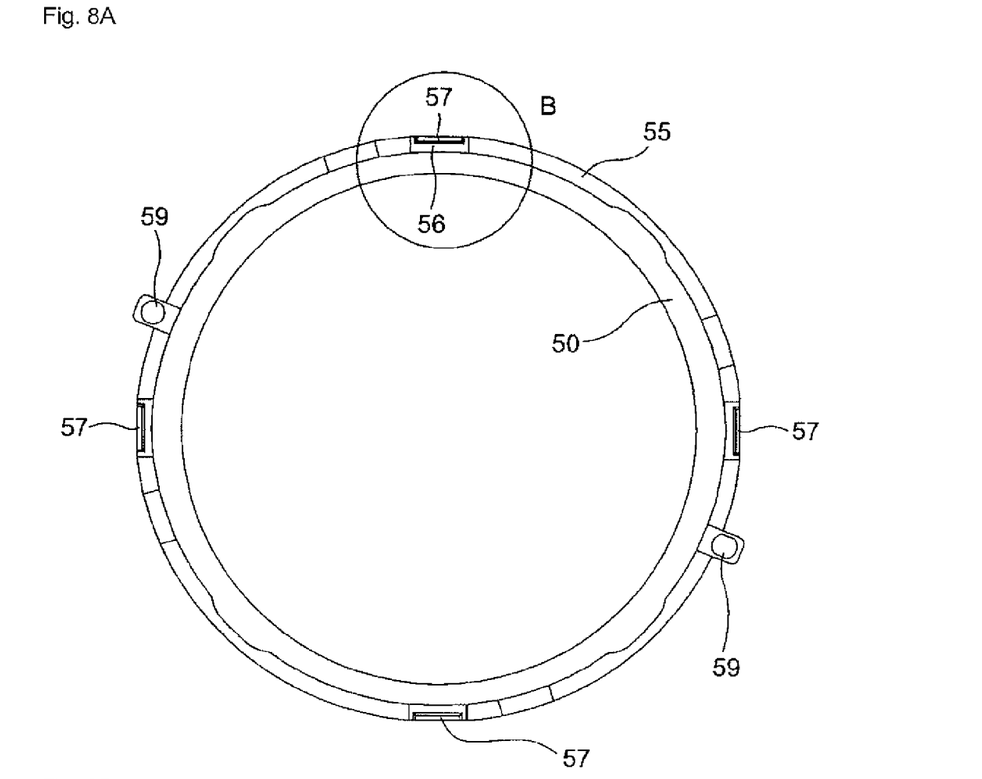
FIG. 8A is a rear side view showing a light guide ring.
Figure 8B:
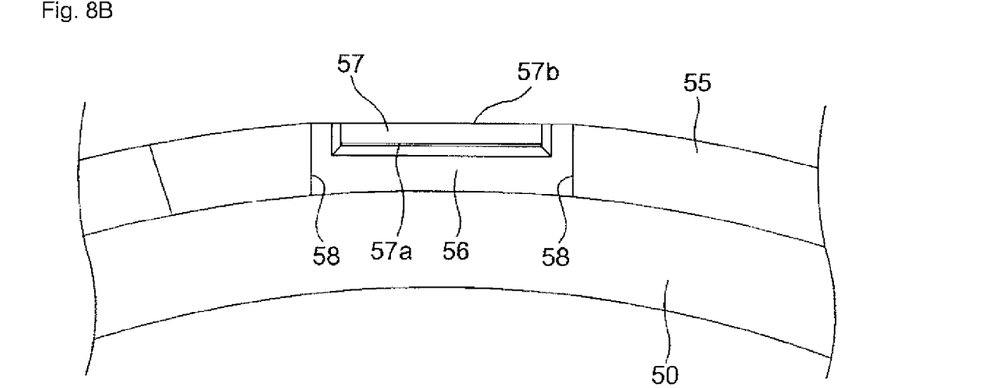
FIG. 8B is a partially enlarged view of a circle B in FIG. 8A.

As shown in FIGS. 6 to 8, the light guide device 50 is made of a translucent material, and is formed in a ring shape which can be fitted in the outer peripheral portion of the manipulation dial 40. The light guide device 50 includes an annular light-emitting portion 51 projected toward an inner peripheral edge portion on the surface side and an annular light guide portion 55 projected toward an outer peripheral edge portion on the backside. The light is emitted outward from an annular upper end face 52 of the light-emitting portion 51. A diffusion material is added to the annular upper end face 52 or a diffusion pattern is disposed in the annular upper end face 52, which allows the light-emitting portion 51 to emit the light more evenly. On the other hand, notch step portions 56 are formed at predetermined intervals in an inner peripheral surface of the light guide portion 55. As shown in FIG. 7C, a sidewall portion 57 constituting the notch step portion 56 and the sidewall portion 57 is located in a front face. The sidewall portion 57 has a reflecting surface by performing satin-like forming or dimple forming to an inward surface 57a. Both side faces constituting the notch step portion 56 are formed in light acceptance surfaces 58 which receive the light reflected from the reflecting surface. A pair of positioning projections 59 is provided in the outer peripheral surface of the light guide portion 55.

Alternatively, and as shown in FIG. 3, in the sidewall portion 57, the satin-like forming or dimple forming may be performed to the outward surface to form the reflecting surface. A reflecting member and a reflecting sheet may separately be provided to reflect the light in an outward surface 57b and/or an inward surface 57a. The satin-like forming or dimple forming may be performed to the light-emitting portion 51, the whole outer peripheral surface of the light guide portion 55, and/or the upper and lower end faces, and the reflecting member and the reflecting sheet may separately be provided. The light acceptance surfaces 58 are not limited to the flat surfaces facing each other in parallel, but a tapered surface, an arc surface, and a combination thereof may be used as the shape of light acceptance surface 58.

A process of assembling the components will be described below. A pair of positioning pins which is a jig (not shown) is inserted in jig holes of the metal base 10 to establish the alignment. On the other hand, after the Hall element 23 is mounted at a predetermined position of the printed board 20, the printed board 20 adheres integrally to the metal base 10. The switches 21 and 22 are disposed at predetermined positions of the printed board 20, and the insulating sheet 23a is integrally bonded to the printed board 20.

As shown in FIGS. 2 to 5 on the other hand, the annular magnet 41 is rigidly bonded in a concentric manner to the backside of the manipulation dial 40, and the sliding sheet 46 is assembled. The annular rib 45 provided in the backside of the manipulation dial 40 is assembled into the fitting hole 31 of the manipulation tool 30 while the sliding sheet 46 and the shielding sheet 35 are interposed, and a fixing ring 39 (FIGS. 2 and 3) is caulked to the annular rib 45 to prevent drop-off. Therefore, the manipulation dial 40 is rotatably supported by the manipulation tool 30 while the sliding sheet 46 and the shielding sheet 35 are interposed. Then, the elastic engaging portion 11 of the metal base 10 engages the engaging pawl 32 of the manipulation tool 30 to integrate the manipulation dial 40 with the metal base 10. As a result, the manipulating projection 34 of the manipulation tool 30 abuts on the center switch 22 of the printed board 20 in a manipulatable manner while the manipulating projection 44 of the push button 43 abuts on the center switch 21 of the printed board 20 in a manipulatable manner.

Then, the manipulation input device 5 is fixed to the base 1 of the portable music player, and the cover 2 is assembled to the base 1 while the ring light guide device 50 is aligned with the manipulation dial 40. Therefore, the manipulation dial 5, the push button 43, and the light-emitting portion 51 of the ring light guide device 50 are exposed from the fitting hole 4 of the cover 2. As shown in FIGS. 2 and 3, LEDs 24 are positioned to the notch step portions 56 of the ring light guide device 50, whereby the light-emitting portion 51 of the LED 24 faces the sidewall portion 57 constituting the notch step portion 56. The light guide portion 55 of the ring light guide device 50 is located immediately below the manipulation directing hole 8 made around the fitting hole 4 of the cover 2. The manipulation directing hole 8 of the cover 2 may be a simple through-hole, and the manipulation directing hole 8 may be filled with a resin material containing diffusion particles diffusing the light.

An example of a method manipulating the portable music player into which the manipulation input device 5 is incorporated will be described below. When the manipulation dial 40 incorporated into the portable music player is turned to integrally turn the annular permanent magnet 41, the pair of Hall elements 23 and 23 senses a change in permanent magnet 41, and the a turning direction and a turning amount are detected based on the change in permanent magnet 41. The detection result is reflected as movement of a scroll bar (not shown) on screen display of the monitor 7 of the portable music player. When the scroll bar reaches a desired position, the push button 43 is pressed to turn on the center switch 21, thereby outputting the selecting direction. In the peripheral portion of the manipulation dial 40, a predetermined position is pressed down to turn on the switch 22 located immediately below the manipulating projection 34 of the manipulation tool 30, thereby outputting the manipulation signal.

In reference to FIGS. 2 and 3, when the LED 24 is lit on during the manipulation, the light emitted from the light-emitting portion of LED 24 is randomly reflected and diffused by the reflecting surface 57a of the sidewall portion 57 of the ring light guide device 50, and the reflected light is received by the light acceptance surfaces 58 and 58. Then, the light guided from the light guide portion 55 to the light-emitting portion 51 is emitted outward from the annular upper end face 52 of the light-emitting portion 51.

The light emitted, reflected, and diffused by the reflecting surface 57a is emitted outward not only from the annular upper end face 52 of the light-emitting portion 51 but also from the light guide portion 55 through the manipulation directing hole 8. Alternatively, the light emitted from the light guide portion 55 through the manipulation directing hole 8 may differ from the light emitted from the annular upper end face 52 of the light-emitting portion 51 in a color by providing a colored light diffusion agent in the manipulation directing through-hole 8. Therefore, advantageously various expressions is enabled to expand a selection range, and a degree of freedom of design is increased.

Example

Figure 9A:
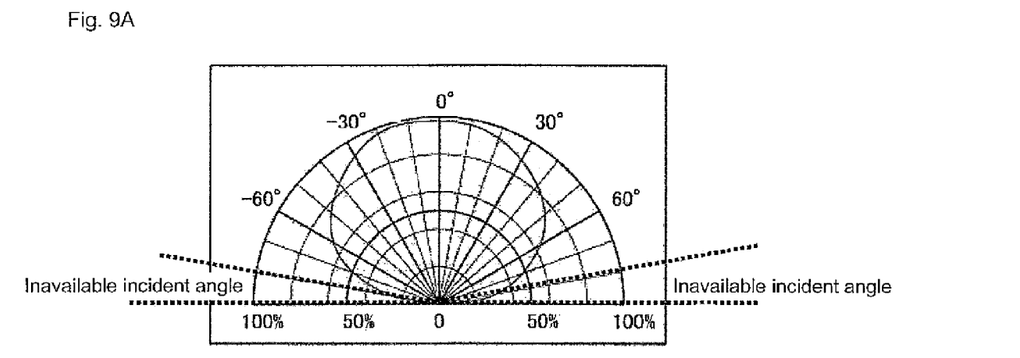
FIG. 9A is a graph showing a directivity property of LED which is of a light-emitting element.

FIG. 9A shows a graph when a light directivity property of LED 24 used in the embodiment is measured. The light directivity property of LED 24 is shown by an elliptical solid line in a semi-circular graph. It is found that the brightness is decreased as an optical axis of LED 24 is inclined from the center.

Figure 9B:
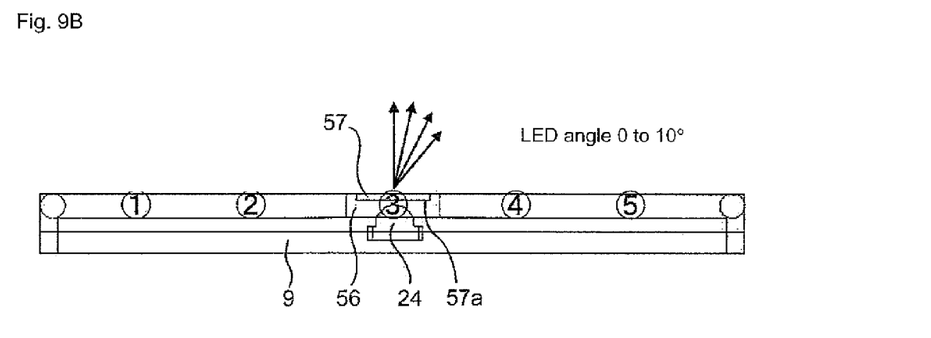
FIG. 9B is a plan view showing a measuring position of Example.

The unevenness of the brightness is measured to specify an allowable range of a light-emitting element attaching tolerance. In the measuring method, as shown in FIG. 9B, the notch step portion 56 is provided in the center of a straight-shape test piece 9 having the same sectional shape as the embodiment. LED 24 is disposed such that the optical axis of the LED 24 is orthogonal to the sidewall portion 57. The reflecting surface 57a is formed by performing the satin-like forming to the inward surface of the sidewall portion 57 constituting the notch step portion 56. Then, measurement positions (five points) are provided at equal intervals on both sides about the central portion of the test piece 9, and the brightness is measured in the lower surface (backside of the paper) of the measurement position, and the unevenness of the brightness is visually observed.

The brightness is measured at each measurement position in the case where LED 24 disposed in the notch step portion 56 of the test piece 9 is inclined by 2.5 degrees from the optical axis toward one side. The unevenness of the brightness is computed from the brightness values obtained from the five measurement positions based on the following equation. The FIG. 9C shows the measurement results.

$$\text{unevenness of brightness} = \text{minimum brightness}/\text{maximum brightness} \times 100 (\%)$$

Accordingly, the larger value is preferable in the uneven brightness, and 100% is the most preferable value.

Figure 9C:
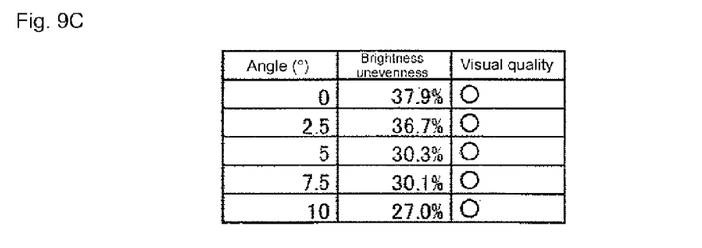
FIG. 9C is a table showing measurement result.

As is clear from FIG. 9C, even if the LED attaching angle is inclined within a rage of +10 degrees to −10 degrees with respect to the optical axis, the uneven brightness is small and there is no practical problem. Then, intersection points with the LED brightness curve are determined by writing inavailable incident angles (+10 degrees and −10 degrees) in the graph of FIG. 9A by dotted lines. As a result, it can be confirmed that the unevenness of the brightness which becomes actually troublesome is not generated even if the light having the brightness ranging 0 to 35% of the maximum brightness is directly incident from LED to the test piece 9. In other words, it is found that the unevenness of the brightness is not generated when LED is attached such that the light emitted from LED except for the light having the brightness ranging 0 to 35% of the maximum brightness, i.e., the strong light is not directly incident to the light guide device. Accordingly, the inavailable incident angle shall mean the allowable range of the light-emitting element attaching angle, where the unevenness of the brightness is not generated. Because the light directivity property depends on LED, obviously the inavailable incident angle is changed in each LED used.

According to the embodiment, the unevenness of the brightness is not generated, when LED is attached such that the light except for the light having the brightness ranging 0 to 35% of the maximum brightness, i.e., the strong light is not directly incident to the light guide device. Therefore, unlike the conventional technique, the high dimensional accuracy and alignment accuracy are not required, so that the production is easily performed to improve the productivity. Particularly, even if the component becomes reduced in size with downsizing the device, the compact light guide device evenly emitting the light can be obtained.

The light guide device of the present invention is not limited to the embodiment, but the light guide device may be formed in various shapes such as a rod shape and a square frame body.

In the embodiment, the light guide device of the present invention is applied to the portable music player. However, obviously the light guide device of the present invention can be applied to other electronic devices such as a mobile telephone and a notebook personal computer.

What is claimed is:

1. A light guide device made of a translucent material, a light-emitting element being disposed in a notch step portion formed by cutting at least a part of an inner peripheral surface in the light guide device, thereby guiding light from the light-emitting element to emit the light to an outside, wherein at least an inward surface constitutes a reflecting surface diffusing the light in a surface and a backside of a sidewall portion of the notch step portion, the sidewall portion facing a light-emitting portion of the light-emitting element, and a pair of facing surfaces adjacent to each other on both sides of the sidewall portion constitutes a light acceptance surface receiving the light reflected from the reflecting surface.

2. The light guide device according to claim 1, wherein at least an outward surface constitutes the reflecting surface reflecting the light in the light acceptance surface in the surface and backside of the sidewall portion of the notch step portion, the sidewall portion facing the light-emitting portion of the light-emitting element.

3. The light guide device according to claim 1, wherein a whole of at least an outer peripheral surface facing the light-emitting portion of the light-emitting element constitutes the reflecting surface.

4. The light guide device according to claim 1, wherein the light guide device is formed in an annular shape.

5. The light guide device according to claim 1, wherein the light guide device is a square frame body.

6. The light guide device according to claim 1, wherein the light acceptance surfaces face each other in parallel.

7. A light guide apparatus, wherein a part of the light-emitting element projected from the notch step portion is coated with a coating sheet in the light-emitting element disposed in the notch step portion of the light guide device according to claim 1.

8. A light guide apparatus, wherein a hole through which light of a light-emitting element can directly be emitted outward from a light guide portion is made in a housing jointed to cover the light guide portion of a light guide device according to claim 1.

* * * * *